March 7, 1939. J. E. MYER 2,150,141
RING TIMBER CONNECTOR
Filed March 16, 1937 2 Sheets-Sheet 1

Inventor
James E. Myer
By Brown & Phelps
Attorneys

March 7, 1939. J. E. MYER 2,150,141
RING TIMBER CONNECTOR
Filed March 16, 1937 2 Sheets-Sheet 2

Inventor
James E. Myer
By Brown & Phelps
Attorneys

Patented Mar. 7, 1939

2,150,141

UNITED STATES PATENT OFFICE 2,150,141

RING TIMBER CONNECTOR

James E. Myer, Washington, D. C., assignor to Timber Engineering Company, Washington, D. C., a corporation of Delaware Application March 16, 1937, Serial No. 131,238

4 Claims. (Cl. 20—92)

The invention relates to timber connectors and has as an object the provision of an improvement in divided ring connectors.

It is a further object of the invention to provide a ring timber connector providing an improved coaction between the ring and the timbers.

It is a further object of the invention to provide a connector of this character that will apply the stresses between the ring and the timber at the points of greatest resistance of the wood to the stresses.

It is a further object of the invention to provide a ring connector that will be pressed into the position for most efficient coaction with the grooves in the timbers in the act of clamping the timbers together.

It is a further object of the invention to provide means at the joint of a divided ring connector to hold the ring in expanded condition for ready insertion into the grooves, said connection yieldable under the stresses of use.

Further objects of the invention will appear from the following description when read in connection with the accompanying drawings showing illustrative embodiments of the invention, and wherein.—

Figure 9:
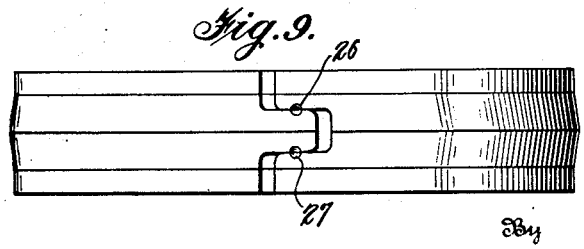

Figs. 4, 5, 6, 7, and 8 are detail sections of portions of rings taken in planes including the axes of the rings, drawn to an enlarged scale and showing various modifications of rings embodying the invention;

Fig. 9 is a detail side elevation of the improved joint of the rings; and

Figure 10:
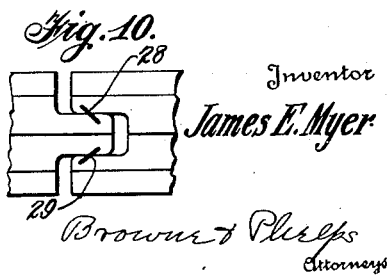

Fig. 10 is a like view of a still further form of joint.

Figure 1:
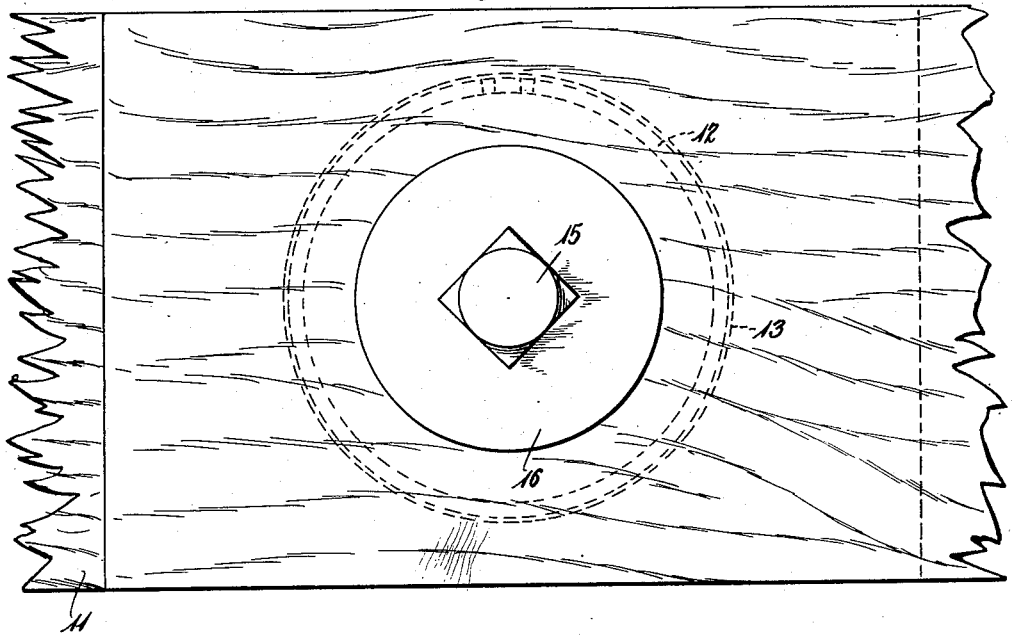
Figure 1 is a plan view of a joint utilizing the connector of the invention.
Figure 2:
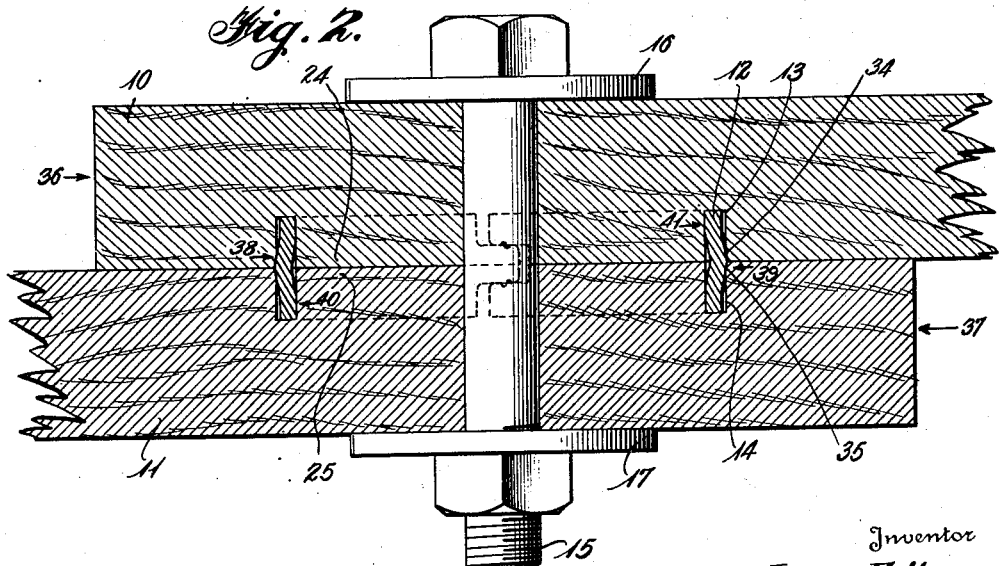
Fig. 2 is a vertical section on line 2—2 of Figure 1.

A ring of the invention is shown in Figures 1 and 2 applied between two timbers 10 and 11, the ring 12 being seated in the usual manner in grooves 13, 14 formed in the meeting faces of the timbers and in registry with each other. As is usual, the timbers are shown as clamped together by means of a bolt 15, washers 16 and 17 being appropriately applied. As shown the ring in each case is of greater external diameter at a plane perpendicular to the axis thereof midway of the height of the ring than is the external diameter at or adjacent the edges thereof.

Figure 3:
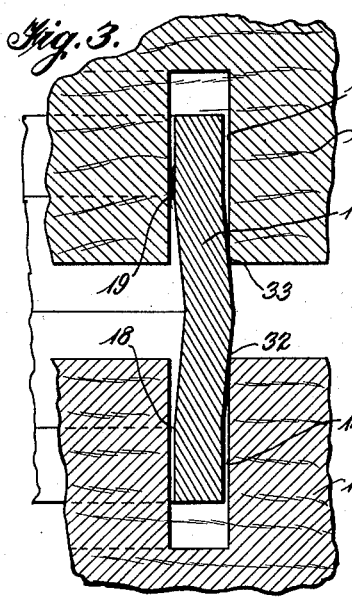
Fig. 3 is a detail section of a form of ring showing its mode of application to a pair of timbers.

In the form of Figures 2 and 3 the ring is of uniform thickness throughout and at its central portion is outwardly convex preferably as shown in the form of a shallow V, while the marginal portions from the points 18, 19 are cylindrical in formation.

Figure 4:
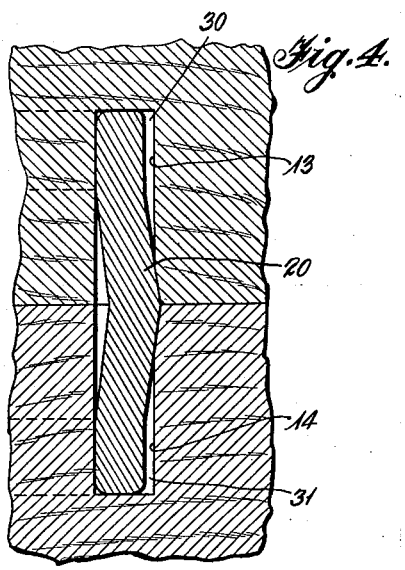

The form of Figure 4 is similar to the form of Figure 3 with the exception that the ring 20 has its corners rounded for more ready introduction into the grooves.

Figure 5:
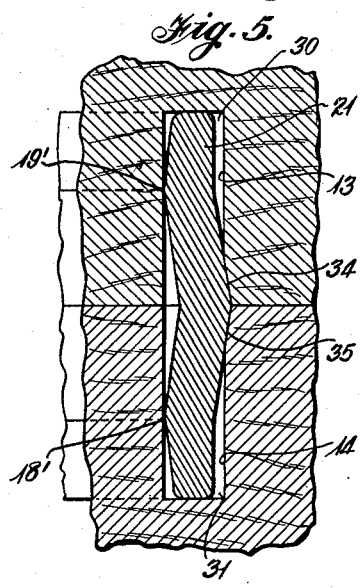

The form of Figure 5 differs from the form of Figure 3 in that the ring 21 thereof is outwardly flared at its inner surface from the points 18', 19' to further assist in its ready introduction.

Figure 6:
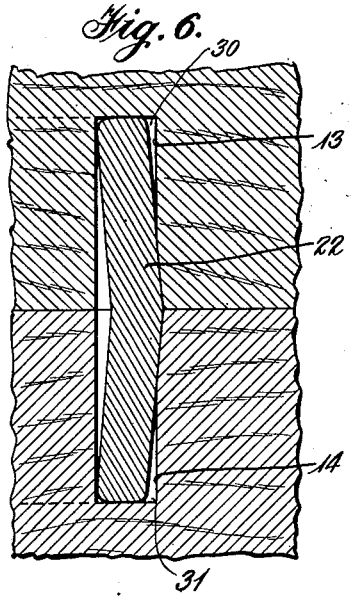

In Figure 6 the shallow V formation both external and internal of the ring 22 is carried from the central plane of the ring to a point closely adjacent its outer edges.

Figure 7:
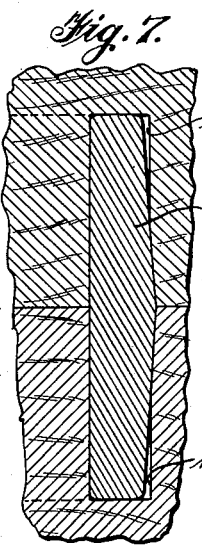

In the form of Figure 7 the outer surface of the ring 23 is of the same form as that shown at 22 but its inner surface is cylindrical resulting in an excess thickness of the ring at its central portion.

In using rings of this character which are divided so as to adjust their diameters to the variations due to swelling and shrinking of the timber, the rings are put into the timber in expanded condition so that they may contract against the bosses 24, 25 surrounded by the grooves 13, 14.

It has therefore been necessary in the introduction of these rings to spread them when introduced. In according with the present invention the rings are spread at the factory and held in spread condition by some means which will permit of their yielding under stress of use. Such a means is shown in Figure 9 as a weak spot-weld at each of the points 26, 27. In the form of Figure 10 the spread-retaining means is shown in the form of cuts or deformations 28, 29 which may be produced as, for instance, by striking a cold chisel held across the joint. It is obvious also that a punch may be used for this purpose, if desired. With the rings thus spread at the factory, they may be readily laid in the grooves and pressed home by clamping together of the timbers.

In each of the forms of the invention the clearance at 30, 31 is shown somewhat exaggerated for purposes of illustration. As shown in Figure 3, when the ring is applied to the groove 14, it will rest at the point 32 against the outer margin of the groove, and when the timber 10 is applied, said timber will rest at the point 33 upon the ring. When the rings are forced home by action of the bolt or other clamping tool, the outer bulge of the ring will be caused to embed in the timbers as indicated at 34, 35, thus causing the ring to be forcibly pressed against the bosses 24, 25 at the bottoms of the grooves. By the resultant compression of the ring the temporary lock 26, 27 or 28, 29 will be broken and the ring will function in service in the usual manner of a divided ring.

When stress is applied in the direction of the arrows 36, 37, Figure 2, the greatest stresses between the ring and the wood will be at the points indicated by the arrows 38, 39, and 40, 41. The greatest resistance to shearing of the bosses from the wood adjacent thereto is obviously at the bottom of the grooves and shear stresses are applied by the ring of the invention, upon the bosses at the points of greatest resistance. Since the distance from the bolt 15 to the ends of the timbers in such a joint can be designed to remove any danger of shearing of the material at 38, 39, the stresses at 38, 39 can be amply cared for and therefore a ring of minimum diameter can be used when formed in accordance with the present invention for the stresses to be met in accordance with the design.

Figure 8:
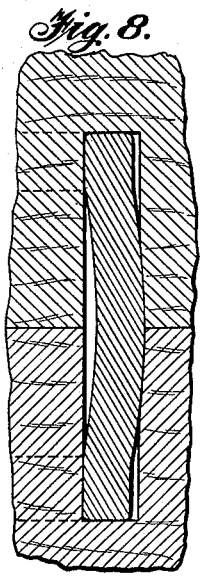

When the outward bulge of the ring is formed on a curve as shown in Figure 8, the extreme pressure against the outer wall of the groove right at the surface of the timber, as at 38, 39 Figure 2, will be moderated and distributed to points below the surface of the timber, enabling a greater pressure to be applied to the boss at the bottom of the groove, as at 40, 41, for the reason that the pressure being lessened at the corner of the boss, a greater pressure may be transmitted to the ring before the fibers will crush.

Minor changes may be made in the physical embodiments of the invention within the scope of the appended claims without departing from the spirit thereof.

I claim:

1. A timber connector of the type to be seated in annular grooves in connected timbers comprising a divided ring of metal; the external and the internal diameters of said ring at a plane substantially midway between its edges being greater than the respectively corresponding diameters thereof at planes adjacent its edges.

2. A timber connector comprising a divided ring of metal; the external diameter of said ring substantially midway between its edges being of greater diameter than its external diameter adjacent said edges; portions of said ring at each side of the joint thereof overlapping; and readily separable means coacting between said overlapping portions to hold the ring in expanded tensed position against its tendency to contract by its resiliency while being inserted for use.

3. A timber connector comprising a divided ring of metal; the external diameter of said ring substantially midway between its edges being of greater diameter than its external diameter adjacent said edges; portions of said ring at each side of the joint thereof overlapping; and readily separable spot-weld means coacting between said overlapping portions to hold the ring in expanded tensed position against its tendency to contract by its resiliency while being inserted for use.

4. A timber joint comprising contacting timbers formed respectively with registering annular grooves and with bolt holes at the axes of said grooves; a divided ring connector seated in said grooves; said ring at its edges of slightly less thickness than the radial extent of said grooves, and of greater external diameter midway of its edges than at said edges; said excess diameter coacting with the outer margins of said grooves to cause at least a portion of the inner surface of the ring to be forcibly pressed against the inner walls of said grooves; and a bolt clamping said timbers together.

JAMES E. MYER.